(No Model.) 2 Sheets—Sheet 1.
H. F. CAMPBELL.
BAND SAW MILL.
No. 291,492. Patented Jan. 8, 1884.
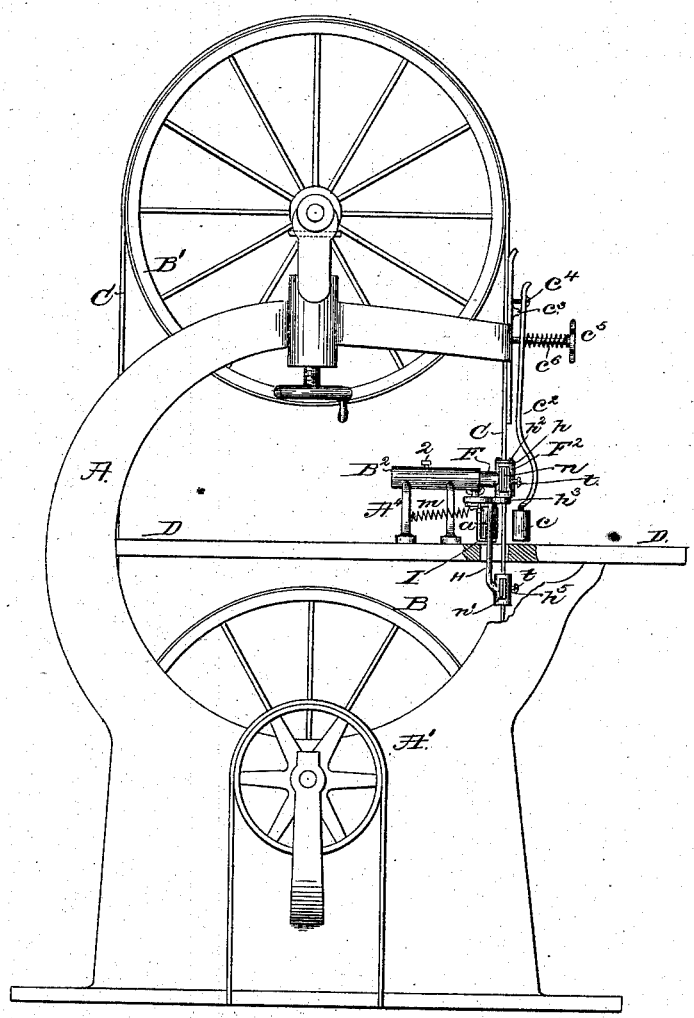
Witnesses.
John F. C. Preinkert
Fred A. Powell.
Inventor:
Henry F. Campbell
by Crosby & Gregory
Attys.

(No Model.) 2 Sheets—Sheet 2.
H. F. CAMPBELL.
BAND SAW MILL.
No. 291,492. Patented Jan. 8, 1884.
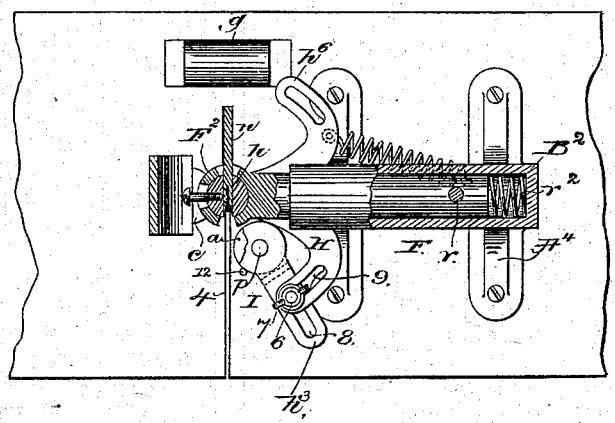
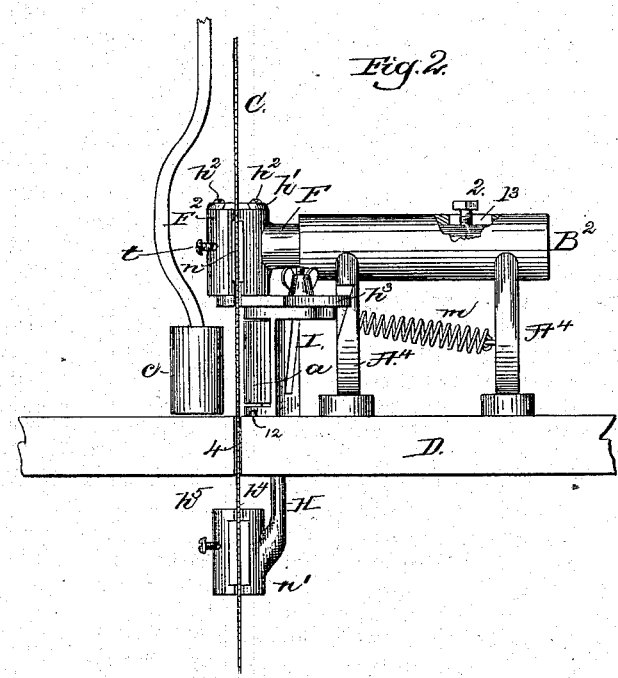
Witnesses: John F. C. Printert, B. J. Noyes.
Inventor: Henry F. Campbell by Crosby Gregory attys

UNITED STATES PATENT OFFICE.

HENRY F. CAMPBELL, OF CONCORD, NEW HAMPSHIRE.

BAND-SAW MILL.

SPECIFICATION forming part of Letters Patent No. 291,492, dated January 8, 1884.

Application filed August 17, 1883. (No model.)

*To all whom it may concern:*

Be it known that I, HENRY F. CAMPBELL, of Concord, county of Merrimac, State of New Hampshire, have invented an Improvement in Sawing Poles, of which the following description, in connection with the accompanying drawings, is a specification, like letters on the drawings representing like parts.

This invention is an improvement on United States Patent No. 255,412, heretofore granted to me; and it has for its object to relieve the band-saw from torsional strain at the cutting-point, or opposite the roller against which the material being sawed rests.

In my patent referred to the elastic or india-rubber-surfaced roller against which the bark side of the pole rested, and into which surface the knots were embedded, was adjustably connected with the table of the machine, and the guides for the saw were fixed on rods above and below the table which would not permit the ready turning of the saw to adapt it to a sharp crook, or permit it to follow quickly or respond to the movements of the elastic roller as it was moved by a knot, wart, or sharp crook; nor would it permit the saw to have the desired swerve necessary to saw a long curve parallel with the outside of the heart of the pole. To obviate these difficulties I have mounted the elastic-surfaced roller on a rod held in a bracket or frame, which is made adjustable on a swiveling throat-piece for the saw, the said throat having two slotted hubs in line with each other, the said hubs being provided with suitable recesses to receive friction-plates to bear against the back and each side of the blade, the said plates being preferably of leather, and having co-operating with them suitable adjusting devices, whereby the said anti-friction plates may be adjusted to enable them to bear properly against the back edge and sides of the band-saw. One of these hubs is made cylindrical externally to serve as a journal for the said throat, and is placed and supported in a box open at one side and connected with a horizontal rod made adjustable in a bearing-box held upon suitable standards attached to the table. This throat, pivoted to turn or rock freely within certain limits, has connected with it a spring, which normally keeps the periphery of the elastic-surfaced roller pressed toward the slit in the table in which slit the band-saw travels.

Figure 1 represents in side elevation a sufficient portion of a hoop-splint-sawing machine which, taken in connection with the machine illustrated and described in my said patent, will enable my present invention to be understood. Fig. 2 is an enlarged detail in side elevation; and Fig. 3 is a top view of Fig. 2, partially broken out.

The frame A, shaft A', pulley B, table or bed D, the band-saw C, the pressure-roller $c$, and the elastic-surfaced roller $a$, and roller $g$ are substantially the same as in the machine described in my said patent, with the exception that the pressure roller $c$ is supported at the end of a spring-arm instead of upon a slide, and the roller is differently supported, as will be described.

The table D has mounted upon it two standards, $A^4 A^4$, which support the sleeve $B^2$, that receives the rod F, provided at its outer or front end with a box, $F^2$, open, as shown, at one side, to receive the band-saw C, and bored centrally to receive the circular hub or journal $h$ at the upper end of the oscillating or vibratory roller carrying throat H. This hub or journal $h$ is slotted to receive the band-saw C, supported above and below the table on suitable pulleys B B', substantially as described in my said patent, and the said band-saw will be driven in the usual manner. The hub or journal $h$ is retained in the said box by means of a cap-plate, $h'$, placed above, and so as to rest upon the box, the said plate being attached to the said hub or journal by screws $h^2 h^2$. Below the hub or journal $h$ the said throat H has a laterally-extended arm, $h^3$, and depending from the latter is an arm, $h^4$, having at its lower end, below the table, (see Fig. 1,) a second hub, $h^5$, located in the same vertical plane as the hub $h$, and also slotted at one side to receive within it and guide the band-saw at a point below the table. These two hubs $h\ h^5$, besides being slotted to receive the band-saw and guide the same, are also provided with suitable recesses to receive leather or other suitable non-metallic anti-friction plates $n\ n'$, the said plates being herein shown as composed of pieces of sole-leather hardened by pressure and slitted each at its front end to receive the back of the band-saw for a greater or less distance, preferably nearly to to the roots of the teeth of the saw. These plates held in the said hubs are acted upon each by its proper screw, $t$, which serves to hold the plate in proper position to bear against the back and sides of the band-saw, and act as a guide therefor, the plates being made adjustable to take up wear caused by the saw. The axis or hub or journal $h$ of the throat H is in the same vertical plane as the slit 4 in the table D, and in which the saw travels. This throat has attached to its arm $h^3$, by a suitable bolt 6 and nut 7, the bracket or yoke I, which is provided with a rod or pin, $p$, that serves as the axis or journal for the elastic roller $a$, against and into the surface of which the knots, warts, crooks, and protuberances of the bark of the pole to be sawed will be pressed while the pole is being sawed to produce hoop-splints, substantially as in my said patent. The bolt 6, connecting the throat H and bracket I, is extended through slots 9 and 8, made in the said parts, respectively, as in Fig. 3, which permits the periphery of the said elastic or supporting roller $a$ to be placed very near the teeth of the band-saw, and very close to the axis of the throat; and the bracket I being attached to the throat at a distance from the axis of the latter enables the throat and its hub to be turned quickly for a considerable distance in response to pressure upon, and to but slight movements of the roller $a$, thus enabling the said hubs, to turn the said blade bodily more or less, and compel the toothed edge of that part of the band-saw located between the hubs $h$ and $h^5$ to always follow promptly the movement of the axis of the roller $a$ as its position with relation to the slit 4 is changed by reason of the pressure against it of the pole being sawed, the teeth of the band-saw and that part of the blade between the said hubs thus always being retained in substantially the same working position with relation to the band-saw, the sides of the band-saw between the said hubs being always parallel with the axis of the roller $a$. The throat H has connected with its arm $h^6$, at the opposite side of the hub or journal $h$, a spring, $m$, which normally acts to keep the periphery of the roller $a$ pressed toward the slot 4, a suitable stop, 12, attached to the table, (see Fig. 1,) limiting the movement of the roller $a$ toward the said slot, and consequently limiting the depth of the entrance of the teeth of the saw toward the heart of the pole. In some instances I have used two rollers like $a$, the second one being adjustably attached to the arm $h^6$ of the throat as the roller $a$ is attached to the arm $h^3$; but I prefer to use but one roller, $a$. The rod F is horizontally adjustable by means of the screw 2 and slot 13, to thus enable the hubs of the throat and their slots to be placed in correct position to enable the band-saw to run perpendicularly between its driving-pulleys B B' and centrally with relation to the slot 4 in the bed; and the turning of these hubs, which grasp or guide the band-saw, enables the latter to be directly turned aside above and below the table for a greater or less distance, as may be needed, for the production of a suitable hoop-splint in accordance with the method of sawing hoop-splints described in my said patent. The pressure-roller $c$ is attached to the lower end of a yielding metal spring, $c^2$, suitably attached at its upper end by screw $c^4$ to the overhanging frame-work A. The spring rests on a fulcrum-block, $c^3$, and is held pressed against it by a spring, $c^6$, about the screw $c^5$, the turning of the said screw causing the said spring-arm $c^2$ to be acted upon by more or less force.

I claim—

1. In a machine for sawing poles, a band-saw, and a throat having a slotted hub adapted to guide the band-saw near the table of the machine, combined with a roller, $a$, connected with the said throat and adapted to serve as a support for the band-saw, whereby pressure of the pole being sawed against the said roller moves the throat and turns the band-saw in the proper direction, substantially as described.

2. In a machine for sawing poles, the throat having two slotted hubs to receive the band-saw, and a box to receive one of the slotted hubs of and sustain the said throat and act as a bearing for it in its oscillations, combined with an adjustable roller, $a$, connected with the said throat and adapted to operate, substantially as described.

3. In a machine for sawing poles, the throat having a slotted hub, and a box to receive and sustain the said hub loosely, and the bracket and roller $a$, attached to the said yoke, combined with the anti-friction plates in the said hub to bear against the back edge and sides of the band-saw, substantially as described.

4. In a machine for sawing poles, the throat having a slotted hub, and a box to receive the said hub and permit it to oscillate, and a roller, $a$, adjustably connected with the said throat, combined with a spring and a stop to regulate the extent of oscillation or turning movement of the said throat, substantially as described.

5. The bed, standards, box, and adjustable arm, and the throat H, having a slotted hub to receive the band-saw, and supported loosely in the said box, combined with the roller $a$, adjustably connected with the said throat, substantially as described.

In testimony whereof I have signed my name to this specification in the presence of two subscribing witnesses.

HENRY F. CAMPBELL.

Witnesses:
W. H. SIGSTON,
B. J. NOYES.